United States Patent [19]

Iaquinto et al.

[11] Patent Number: 5,307,209

[45] Date of Patent: * Apr. 26, 1994

[54] MAGNIFIER APPARATUS AND METHOD FOR HAND HELD VIDEO DISPLAY

[75] Inventors: Gregory A. Iaquinto, Keene, N.H.; Louis J. Bakanowsky, III, Fitchburg, Mass.

[73] Assignee: Curtis Manufacturing Company, Inc., Jaffrey, N.H.

[ * ] Notice: The portion of the term of this patent subsequent to Jun. 2, 2009 has been disclaimed.

[21] Appl. No.: 34,140

[22] Filed: Mar. 22, 1993

Related U.S. Application Data

[63] Continuation-in-part of Ser. No. 639,713, Jan. 8, 1991, Pat. No. D. 334,207.

[51] Int. Cl.$^5$ .............................. G02B 7/02
[52] U.S. Cl. .................... 359/811; 359/804
[58] Field of Search ............ 359/804, 805, 808, 809, 359/810, 802, 803, 601, 609, 811

[56] References Cited

U.S. PATENT DOCUMENTS

| | | | |
|---|---|---|---|
| 3,955,884 | 5/1976 | Del Pesco, Sr. | 359/804 |
| 4,712,870 | 12/1987 | Robinson et al. | 359/811 |
| 4,991,935 | 2/1991 | Sakurai | 359/804 |
| 5,048,928 | 9/1991 | Davis | 359/809 |
| 5,119,239 | 6/1992 | Iaquinto et al. | 359/811 |
| 5,130,853 | 7/1992 | Sakurai | 359/803 |

FOREIGN PATENT DOCUMENTS 0478802  4/1992  European Pat. Off. .

*Primary Examiner*—Loha Ben
*Attorney, Agent, or Firm*—Richard P. Crowley

[57] ABSTRACT

A magnifier apparatus for use with a hand-held video display apparatus which magnifier apparatus has a frame with a magnifier lens, the frame secured to a support, the support releasably adapted to be secured in a snap-in relationship to the sides of the housing of the video display apparatus in an upright, correct position, the frame with the magnifier lens adapted to move between an open, use position over the screen of the video display apparatus and a closed, non-use position nested within the support.

10 Claims, 2 Drawing Sheets

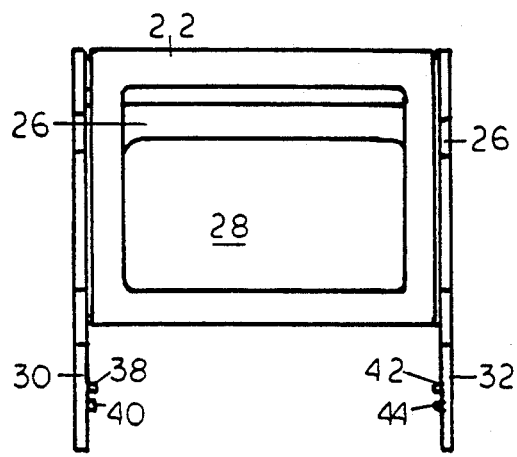
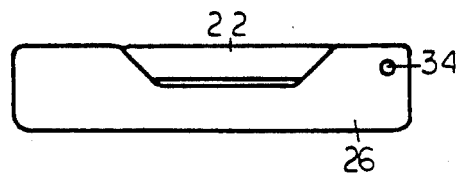
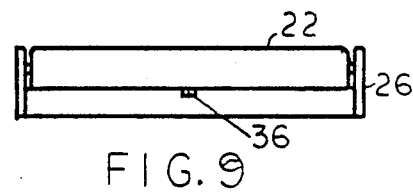
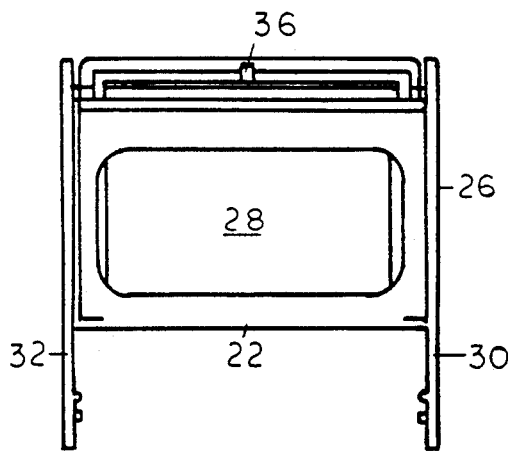
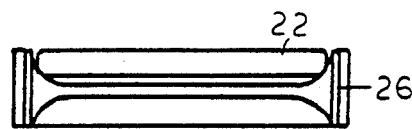

MAGNIFIER APPARATUS AND METHOD FOR HAND HELD VIDEO DISPLAY

REFERENCE TO PRIOR APPLICATION

This application is a continuation-in-part of U.S. Des. patent application Ser. No. 07/639,713, filed Jan. 8, 1991 now U.S. Pat. No. Des. 334,207 issued Mar. 23, 1993.

BACKGROUND OF THE INVENTION

Video display apparatus, particularly hand-held, portable, computer-based video display apparatus, such as the video display game known Game Boy ™ (a trademark of Nintendo of America, Inc.) are in wide use. Such video display apparatus typically comprise a housing which include and support a video display screen, such as an LCD screen for external viewing by the user. Video display apparatus typically also include various means, such as levers, buttons and knobs on the housing to enable a video operator to manipulate the controls with one hand while holding the video display apparatus in the other hand.

One disadvantage to many of the hand-held, portable video display apparatus, such as the Game Boy ™ video display apparatus, is the small size of the video display screen, which typically may range from five to ten square inches and generally are flat and rectangular display screens. In addition, displayed on the display screen are often small sized figures, characters, words, letters or instructions, which are often difficult to see, and therefore affects the efficiency and pleasure of the operation of the video display apparatus. It is therefore desirable to provide for effective means to improve the visibility of the video display, particularly in a portable, hand-held video display apparatus so as to enhance the ability of the operator to observe the indicia on the display screen and operate and play the game.

One magnifying device for use with hand-held video display apparatus is described in U.S. Pat. No. 4,991,935, issued Feb. 12, 1991. Such magnifying device includes a fixed frame which is slidably and releasably mounted on the video display housing, and which has a magnifier-type lens adapted to overlie the video display and effect magnification of the video display during operation. The magnifier lens is placed in a fixed position in a frame within the magnifying device.

A magnifier for a liquid crystal display TV apparatus is described in U.S. Pat. No. 4,443,819 issued Apr. 17, 1984, wherein a lens is pivotably mounted on a support which support is pivotably mounted at the other end to the TV housing and not releasably secured to the housing or adjustable for lateral movement on the housing to a fixed position.

It is desirable to provide for an efficient, easily mountable and dismountable, portable, simple magnifier apparatus, particularly for use with portable, hand-held video display apparatus to enhance the visibility of the display screen.

SUMMARY OF THE INVENTION

The invention relates to a magnifier apparatus for use with a hand-held video display apparatus and to a system and method of using such magnifier apparatus. In particular, the invention concerns a magnifier apparatus for use with a hand-held, portable video display apparatus, such as a Game Boy ™ apparatus, which magnifier apparatus is portable and easily manufactured and adapted for movement between an open, use position to enhance the image of the video display on the video display apparatus, and a closed, non-use, portable, compact position, and which is releasably, adjustably fixed in position on the video display apparatus.

The invention comprises a magnifier apparatus for use with a hand-held video display apparatus, and which apparatus has a housing with sides, external controls for operation of the apparatus and a generally rectangular video screen within the housing and supported by the housing and which screen is visually observable externally of the housing by the operator. The magnifier apparatus for use with the hand-held video display apparatus comprises a frame and a magnifier lens supported by the frame and generally positioned within the frame, the magnifying lens being generally flat and of sufficient magnifying capacity to enhance the visibility of the images on the video display screen.

The magnifier includes a support for the frame, the support having a one and the other end and generally spaced apart, extending legs at the one end so that the support may be mounted in a releasable, e.g. snap-fit, manner over the housing over and onto the respective sides of the housing of the video display apparatus. The extending legs of the support are generally thin and flat and of sufficient width and contain on the interior surface a raised ridge or other means so as to provide for a snap-in of the ridge into a peripheral groove on each of the external side surfaces of the housing of the video display apparatus to permit slidable lateral movement to adjust the position of the support in relation to the housing. Typically, the support is so disposed so as to be generally perpendicular to the plane of the housing apparatus, or so positioned so as to provide for the plane of the frame with the magnifier to be generally perpendicular to the plane of the video display screen in use.

The frame is hingedly connected at the other end of the support to permit the frame, together with the magnifier lens, to move between an open magnifying, use position directly above and generally aligned over the area of the video display screen so as to permit the operator to easily observe the enhanced image of the video display screen with the plane of the magnifier lens generally parallel to the plane of the underlying video display screen, and a closed, non-use position generally parallel to the plane of the support, which represents a compact, portable, carrying position for the magnifier apparatus. Generally, the frame and magnifier apparatus are hingedly connected at the other end of the support a sufficient distance depending upon the magnification focal length of the magnifier lens to provide for an enhanced image, such as for example in use of about three to five inches from the plane of the video display screen.

The magnifying apparatus also includes means to retain the frame and the magnifier lens in the use position, such as the employment of a raised indent means on the interior surface of the frame, which as the frame is moved generally to the plane parallel to the plane of the video display screen provides for a snap-in of the indent against the adjacent interior surface of the upper edge of the support to hold and retain the frame and magnifier lens in a use position, and yet permit the frame and the magnifier lens to be returned to a compact, non-use position by slight pressure by the user to overcome the indent against the interior surface of the support means thus providing for the snap-in position between the use and the non-use position of the magnifying apparatus.

Also, importantly, the magnifying apparatus is characterized by a support means characterized by a generally open area centrally positioned thereon, so that while the magnifying apparatus is in the use position, the operator may view the video screen at an angle through the open area of the support with typically the open area being centrally positioned and rectangular with generally the frame is slightly larger in rectangular dimensions than that of the video display screen.

The support comprises at the other end a means or device by which the other end of the support means may be releasably secured to the housing of the video display apparatus, so as to position the support means vertically and upwardly from the planar surface of the housing and to permit the frame and magnifier lens to overlie the video display screen. Typically, the magnifier apparatus is composed of a molded plastic, such as injection molded styrene polymer, except for the magnifying lens, which may be glass or plastic. In one embodiment, the interior surface of each spaced leg of the support includes a raised, e.g. horizontal, ridge generally parallel to a side groove which runs peripherally around the housing of the video display apparatus with the raised ridge adapted to snap-fit into a side peripheral groove of the Game Boy TM so as to retain the support in a releasable manner in position and to provide for slidable, horizontal movement in the groove to position the support on the housing in a correct position, and yet provide for easy removal of the magnifier apparatus from the video display apparatus. In addition, optionally the interior surface of each leg of the support would include a raised, e.g. vertical, insert which is adapted to snap-fit into one of a generally matching, vertical, parallel grooves of a Game Boy TM video display apparatus, a plurality of which grooves are parallel arranged on either side of the housing of the display and generally below the video display, so that the magnifier apparatus is snap-fit onto the housing of the video display both by a peripheral ridge fitting into a peripheral groove and an insert fitting into a groove which is perpendicular to the peripheral groove which locks the frame into a non-sliding, correct position on the housing.

The invention also relates to the combination of a hand-held video display apparatus containing a housing and a video display screen, such as an LCD screen, and more particularly, a Game Boy TM apparatus, in combination with the magnifier apparatus of the invention. The simple, slim construction of the magnifier apparatus contrasts to the bulky, slide-on, releasable-type magnifying apparatus found in U.S. Pat. No. 4,991,135 which permits for a simple, inexpensive magnifying apparatus, and yet permits further accessories to be employed with the hand-held video display apparatus, such as for example the employment of lights to enhance the display of the video screen of the video display apparatus, as well as the employment of an amplifier to amplify the sound from the video display apparatus.

The invention also includes a method of magnifying an image on the video display screen supported within a housing of a hand-held video game computer apparatus and which method comprises placing a support in a releasable, generally vertical, upright mounting position on the housing of the video display apparatus and typically through extended, spaced apart legs at the one end of the support, by placing the legs on either side of the housing of the video display apparatus and typically which snap-fit in a relationship with the sides of the housing of the video display apparatus; and mounting a frame with a magnifying lens on the support, the frame mounted for hinged movement between an open, magnifying, in-use position above and generally parallel to the plane of the spaced apart, underlying video display screen and generally perpendicular from the support, and a closed, non-use position wherein the frame is generally in a compact, parallel position to the plane of the support and typically fits within the confines of the thin sides of the support in a portable, compact manner.

The method includes providing ridges and indents on the interior surface of the extended legs of the support which may be engaged in a snap-in mating relationship with the peripheral parting line and/or the generally parallel grooves of the hand-held video game apparatus, such as a Game Boy TM apparatus. It also includes providing a means so that the frame and magnifying lens are retained in an open, use position and may be easily returned to a non-use position by slight pressure of the hand of the operator to overcome a mechanical detent, and providing a support frame with a central, open area so that the operator may also view the video display screen of the hand-held video display apparatus through the open area of the support indirectly as well as through the magnifying lens.

The invention provides for a simple, inexpensive, effective, compact and portable magnifying apparatus and method for use with a hand-held video display apparatus.

The invention will be described for the purposes of illustration only in connection with certain embodiments; however, it is recognized that various modifications, changes, additions and improvements may be made by those persons skilled in the art, all falling within the spirit and scope of the invention.

BRIEF DESCRIPTION OF THE FIGURES

FIG. 7 is a front elevational view of the magnifying lens apparatus in the closed, non-use position.

FIG. 8 is a side elevational view of the magnifying lens apparatus of FIG. 7.

FIG. 9 is a top plan view of the magnifying lens apparatus of FIG. 7.

FIG. 10 is a back elevational view of the magnifying lens apparatus of FIG. 7.

FIG. 11 is a bottom plan view of the magnifying lens apparatus of FIG. 7.

DESCRIPTION OF THE EMBODIMENTS

Figure 1:
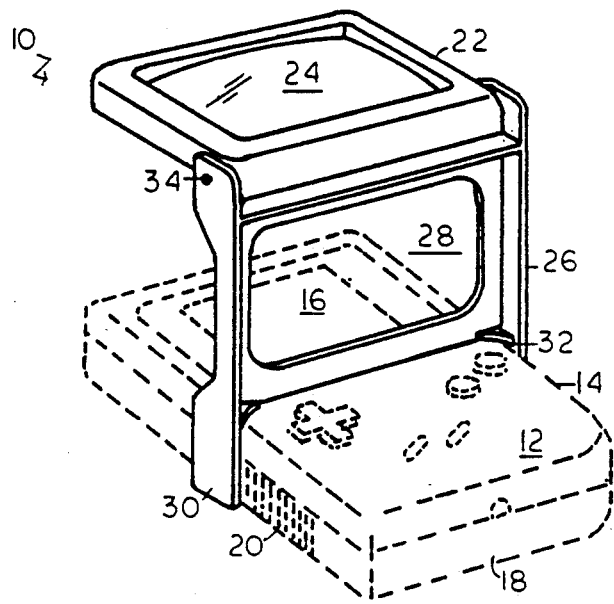
FIG. 1 is a perspective view of the magnifying lens apparatus of the invention in the open, use position overlying a video screen apparatus shown in dotted lines.
Figure 2:
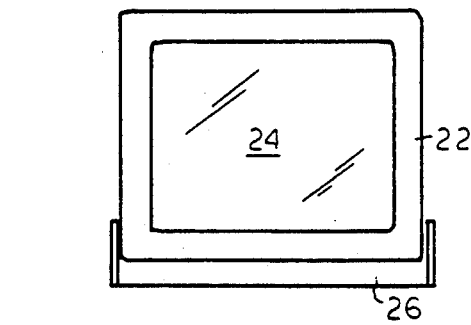
FIG. 2 is a top plan view of the magnifying lens apparatus of FIG. 1.
Figure 3:
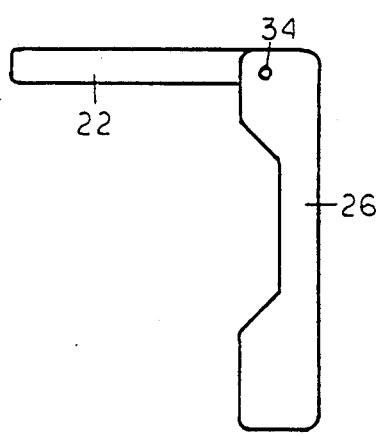
FIG. 3 is a side elevational view of the magnifying lens apparatus of FIG. 1.

FIG. 1 shows a system 10 which comprises a combination of a magnifying apparatus of the invention together with a video display apparatus 12, the display shown being a portable, hand-held Game Boy ™ video display apparatus having a housing 14 and having a flat LCD video screen 16 for video display of images and with a peripheral, horizontal, inward groove 18 parting line centrally positioned around the housing 14 and with a plurality of parallel design, vertical grooves 20 disposed on either side of the housing 14, with parting line 18 and parallel grooves 20 peculiar to the Game Boy ™ video display apparatus. The magnifying lens includes a frame 22, a flat glass magnifying lens 24 and a support 26, the support having a wide generally rectangular, open area 28 and includes two downwardly extending legs 30 and 32 at the one end of the support 26. The frame 22 with the magnifying lens 24 is engaged with the support for hinged movement through the use of an outwardly extending hinge pin 34 on either side of the frame and into a recess in the top section of the frame of the support 26 so that the frame 22 and the lens 24 may move between an open, use position, as illustrated in FIG. 1, and closed, compact, non-use position as illustrated in FIGS. 7-11.

As illustrated, in the open, use position, the frame 22 and the lens 24 are positioned generally parallel to the underlying, spaced apart video screen 16 of the video display apparatus 12 with the focal length of the magnifying lens selected to provide for amplification for the video screen, so that the operator may externally view the video screen 16 through the magnifying lens 24 and receive a magnified image thereof. As illustrated, the support 26 is generally perpendicular to the plane of the viewer screen 16 and the top plane of the housing 14, with the frame 22 extending generally perpendicularly outwardly from and over the video screen 16. In the closed position, the frame 22 with the lens 24 easily folds downward and is generally parallel to the support 26 and in fact nests within the extending support sides thereof to form in a non-use position a portable, easily carried, compact magnifying apparatus.

Figure 4:
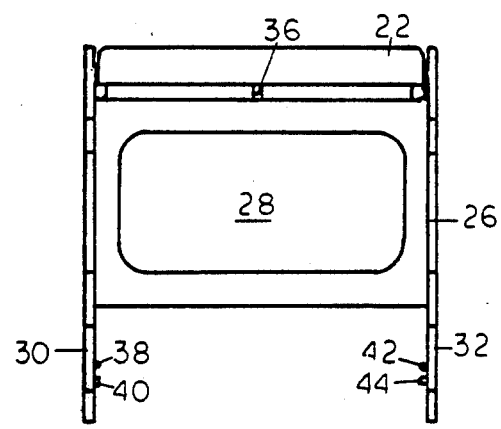
FIG. 4 is a front elevational view of the magnifying lens apparatus of FIG. 1.
Figure 5:
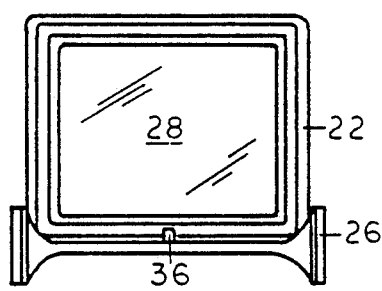
FIG. 5 is a bottom plan view of the magnifying lens apparatus of FIG. 1.
Figure 6:
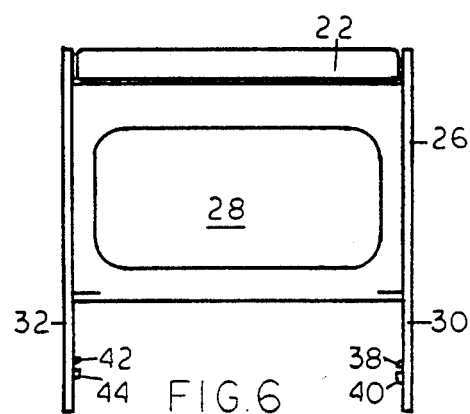
FIG. 6 is a back elevational view of the magnifying lens apparatus of FIG. 1.

With particular reference to FIGS. 4, 5 and 10, there is shown centrally disposed on the interior surface of the frame 22 a raised detent 36 which at one end extends slightly below the upper edge of the frame 22 which has a slightly rounded outer surface. In operation, the user moves the frame 22 upwardly into the use position and the outer rounded edge of the detent moves across the upper edge of the frame 22 and the detent snaps into position and stands against the interior surface of the upper edge of the frame 22 to retain the frame 22 in a use position. The frame 22 is returned to the compact position by slight downward pressure of the user on top of the frame 22 so that the detent moves off its snap-in position on the edge as illustrated and hingedly into a compact position as illustrated more particularly in FIG. 10.

The interior surfaces of the extending legs 30 and 32 of the support 26 contain on either side slightly raised ridges 38 and 42 which are adapted to snap-in to the peripheral parting groove 18 of the video display apparatus 12. The support 26 may be slid in the groove into position so that the frame 22 is above the screen 16. In addition, the interior surfaces of the each of the legs 30 and 32 contain raised inserts 40 and 44 of sufficient size so that it may be snapped into one of the generally parallel grooves 20 of the video display apparatus 12, so as to retain the support in the correct position both by the ridges 38 and 42 and the inserts 40 and 44 in a snap-in supporting relationship to the video game apparatus 12 to retain the support 26 in a generally upright, perpendicular position from the plane of the housing 14 of the video game apparatus 12. The support is easily releasable by outward hand pressure from the operator to unsnap the ridges 38 and 42 and inserts 40 and 44 from their mating relationship so that the frame 22 may be integrally folded into the compact storage, non-use position.

The magnifying apparatus and method as described and illustrated in the drawings provides for a simple, compact magnifying lens for use with a video game apparatus having a video display screen and which may be readily moved between a use and a non-use, compact position.

What is claimed is:

1. A magnifier apparatus for use with a hand-held video display apparatus which video display apparatus has a housing with sides and a video display screen within the housing, the display screen visually observable externally of the housing and which magnifier apparatus comprises:
   a) frame means;
   b) a magnifying lens supported by the frame means;
   c) support means for the frame means, the support means having a one and the other end, the support means adapted at the one end to be mounted in a releasable manner in a generally upright vertical position perpendicular to the plane of the video screen to the housing; and
   d) hinge means at the other end of the support means to permit the frame means with the magnifying lens to move between an open, magnifying use position, spaced apart and above and generally parallel to the plane of the video display apparatus and a closed, non-use position generally parallel to the plane of the support means.

2. The apparatus of claim 1 which includes means to provide for the snap-in retention of the frame means and the magnifying lens in the open, use position.

3. The apparatus of claim 2 which includes an indent adapted to snap fit in a retaining position against an upper edge of the support means to retain the frame means and magnifying lens in the open, use position.

4. The apparatus of claim 1 wherein the support means is characterized by a central open area therein so that the video display screen may be viewed through said central open area.

5. The apparatus of claim 1 which includes raised means on the one end of the support means adapted to snap fit into a recess of the housing of the video display apparatus to retain the support means in a generally upright position.

6. The apparatus of claim 1 wherein the support means includes spaced apart, extended legs at the one end which includes a raised insert means on the interior surface of each of the extended legs, the raised insert means adapted to snap fit into a groove on the side of the housing of the video display apparatus to position and retain the support means and the frame means and magnifying lens in a desired position above the video display screen.

7. A hand-held video display apparatus having a housing with a video display screen therein in combination with the magnifier apparatus of claim 1.

8. A method of magnifying an image on a video display screen of a hand-held computer apparatus having a housing which supports the video screen, and which method comprises:

a) placing one end of a support means in a releasable, generally upright secured position on the housing; and b) mounting a frame means with a magnifying lens for hinged movement on the support means at the other end for movement of the frame means between an open, use position wherein the magnifying lens extends in a spaced apart relationship directly above the video display screen of the computer apparatus and generally parallel thereto to permit the external viewing and magnification of the images on the display screen, and a closed, compact position wherein the frame means and magnifying lens are generally parallel to the support means.

9. The method of claim 8 which includes snap fitting the one end of the support means onto a recess of the housing when the frame is positioned directly over the video display screen.

10. The method of claim 8 which includes releasing the support means from the housing and hingedly folding the frame means and the magnifying lens into a closed, non-use, compact position within the sides of the support means for carrying by the user.

* * * * *